(12) United States Patent
Liu et al.

(10) Patent No.: US 12,166,711 B2
(45) Date of Patent: Dec. 10, 2024

(54) SYSTEMS AND METHODS OF LOW POWER INDOOR TRANSMISSION IN A WIRELESS NETWORK

(71) Applicant: MediaTek Singapore Pte. Ltd., Singapore (SG)

(72) Inventors: Jianhan Liu, San Jose, CA (US); Yongho Seok, San Jose, CA (US); Kai Ying Lu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 471 days.

(21) Appl. No.: 17/521,361

(22) Filed: Nov. 8, 2021

(65) Prior Publication Data

US 2022/0150015 A1 May 12, 2022

Related U.S. Application Data

(60) Provisional application No. 63/111,106, filed on Nov. 9, 2020.

(51) Int. Cl.
*H04W 72/04* (2023.01)
*H04L 1/08* (2006.01)
(Continued)

(52) U.S. Cl.
CPC ............. *H04L 5/0048* (2013.01); *H04L 1/08* (2013.01); *H04L 5/0055* (2013.01); *H04L 25/0202* (2013.01); *H04L 27/2692* (2013.01)

(58) Field of Classification Search
CPC ... H04L 5/0048; H04L 5/0055; H04L 5/0037; H04L 5/0044; H04L 5/0053; H04L 1/08;
(Continued)

(56) References Cited

U.S. PATENT DOCUMENTS

2010/0316175 A1* 12/2010 Zeng .................... H04L 27/0014
375/360
2011/0013547 A1* 1/2011 Liao ..................... H04B 7/0671
370/476
(Continued)

OTHER PUBLICATIONS

NPL, Junghoon Suh et al, Huawei, IEEE 802.11-20/1347r3—LPI PPDU Format, Aug. 28, 2020 (Year: 2020).*
(Continued)

*Primary Examiner* — Mahbubul Bar Chowdhury

(57) ABSTRACT

Embodiments of the present invention provide duplication schemes for control frames to extend the range of LPI in the 6 GHz wireless band for EHT WLAN. Duplicate 20 MHz legacy preambles containing L-STF, L-LTF, L-SIG and RL-SIG, U-SIG and EHT-SIG fields may be used to transmit beacon and other control frames using duplicate PPDUs to extend transmission range thereof. Non-HT duplication can be performed to maintain backwards compatibility with legacy devices. HE duplication can include duplication of a 20 MHz HE SU PPDUs over 40 MHz, 80 MHz, 160 MHz or 320 MHz portions, for example. DCM+MCS0 or duplication over DCM+MCS0 may be applied to the payload, and a duplication indication is inserted in the U-SIG field or EHT-SIG field to indicate if the duplication is applied to the payload over DCM+MCS0.

21 Claims, 7 Drawing Sheets

(51) Int. Cl.
*H04L 5/00* (2006.01)
*H04L 25/02* (2006.01)
*H04L 27/26* (2006.01)

(58) Field of Classification Search
CPC ............ H04L 25/0202; H04L 27/2692; H04L 27/2602
See application file for complete search history.

(56) References Cited

U.S. PATENT DOCUMENTS

| 2016/0233998 | A1* | 8/2016 | Sun | H04B 17/336 |
| 2017/0238286 | A1* | 8/2017 | Chun | H04W 72/21 |
| | | | | 370/329 |
| 2020/0137734 | A1* | 4/2020 | Chun | H04L 27/26 |
| 2020/0280351 | A1* | 9/2020 | Kwon | H04L 5/0023 |
| 2021/0391961 | A1* | 12/2021 | Cao | H04L 1/08 |
| 2023/0061290 | A1* | 3/2023 | Yu | H04W 28/20 |

OTHER PUBLICATIONS

NPL, Ron Porat, Broadcom, IEEE 802.11-20/0965r4—6GHz LPI Range Extension, Aug. 4, 2020 (Year: 2020).*

* cited by examiner

| L-STF | L-LTF | L-SIG | RL-SIG | HE-SIG-A | HE-STF | HE-LTF | HE Payload |
| --- | --- | --- | --- | --- | --- | --- | --- |
| L-STF | L-LTF | L-SIG | RL-SIG | HE-SIG-A | HE-STF | HE-LTF | HE Payload |
| L-STF | L-LTF | L-SIG | RL-SIG | HE-SIG-A | HE-STF | HE-LTF | HE Payload |
| L-STF | L-LTF | L-SIG | RL-SIG | HE-SIG-A | HE-STF | HE-LTF | HE Payload |

FIG. 3

SYSTEMS AND METHODS OF LOW POWER INDOOR TRANSMISSION IN A WIRELESS NETWORK

CROSS-REFERENCE TO RELATED APPLICATIONS

This application claims the benefit of and priority to provisional patent application Ser. No. 63/111,106, with filing date Nov. 9, 2020, by Jianhan Liu, et al., which is hereby incorporated by reference in its entirety.

FIELD

Embodiments of the present invention generally relate to the field of wireless communications. More specifically, embodiments of the present invention relate to systems and methods of low power indoor transmissions in a wireless communication network.

BACKGROUND

Modern electronic devices typically send and receive data with other electronic devices wirelessly using Wi-Fi, and recent advances in the field of Wi-Fi have enabled low power transmissions specifically designed for indoor environments to prevent or reduce undesirable interference with other wireless networks operating nearby. Low Power Indoor (LPI) is a Wi-Fi technology that uses a limited transmission power in the 6 GHz wireless band so that the transmitted signal does not typically leave the intended environment (e.g., building, room, etc.) and interfere with other 6 GHz transmission.

LPI transmissions operating in the 6 GHz wireless band have strict power spectrum density (PSD) requirements for lower power transmissions. Therefore, low power indoor transmission performed over 6 GHz using conventional transmission techniques typically results in a relatively short range of reliable transmission due to power density requirements of LPI. For example, 20 MHz transmissions using LPI over 6 GHz are limited to 18 dBm compared to a 30 dBm limit for LPI transmission over 5 GHz. Accordingly, the effective range of 6 GHz LPI is a quarter of the range of 5 GHz LPI, and the cover area of 6 GHz LPI is just 1/16 of 5 GHz LPI. Importantly, the UL range of 5 GHz transmissions can be extended using smaller RU sizes for trigger based physical-layer protocol data units (PPDUs). However, the UL range of 6 GHz transmissions cannot use smaller RU sizes for trigger based PPDUs.

Moreover, existing legacy devices operating over 6 GHz should be supported by 6 GHz LPI transmissions. However, transmission of beacon and control frames using separate PPDUs for legacy devices is undesirable due to reduced spectral efficiency and increased latency.

SUMMARY

Accordingly, what is needed is an approach to wireless transmissions using LPI over 6 GHz that increases the range of reliable transmission while satisfying LPI power density requirements while supporting legacy devices. Embodiments of the present invention provide duplication schemes for control frames to extend the range of LPI in the 6 GHz wireless band for EHT WLAN. Duplicate 20 MHz legacy preambles containing L-STF, L-LTF, L-SIG and RL-SIG, U-SIG and EHT-SIG fields may be used to transmit beacon and other control frames using duplicate PPDUs to extend transmission range thereof. Non-high throughput (non-HT) duplication can be performed to maintain backwards compatibility with legacy devices. HE duplication can include duplication of a 20 MHz HE SU PPDUs over 40 MHz, 80 MHz, 160 MHz or 320 MHz portions.

According to one embodiment, a method of low power indoor (LPI) transmission in a wireless network is disclosed. The method includes generating a 20 MHz HE PPDU comprising a control frame, duplicating the 20 MHz HE PPDU to generate a plurality of duplicated 20 MHz HE PPDUs associated with different wireless sub-channels, and transmitting the 20 MHz HE PPDU and the plurality of duplicated 20 MHz HE PPDUs to a wireless receiving device using LPI transmission.

According to some embodiments, the plurality of duplicated 20 MHz HE PPDUs comprises 3 duplicated 20 MHz HE PPDUs, and wherein the 20 MHz HE PPDU and the plurality of duplicated 20 MHz HE PPDUs are transmitted over an 80 MHz bandwidth.

According to some embodiments, the LPI transmission is performed over a 6 GHz wireless band.

According to some embodiments, the control frame is a beacon frame.

According to some embodiments, the method includes transmitting the 20 MHz HE PPDU PPDU over a primary 20 MHz sub-channel.

According to some embodiments, the wireless receiving device is an HE wireless receiving device, wherein the control frame comprises control information, wherein the control frame is operable to be decoded by the HE wireless receiving device to access the control information according to the 20 MHz HE PPDU transmitted over the primary 20 MHz sub-channel.

According to some embodiments, the wireless receiving device is an HE wireless receiving device, wherein the control frame comprises control information, wherein the control frame is operable to be decoded by the HE wireless receiving device to access the control information by processing the plurality of duplicated 20 MHz HE PPDUs and the 20 MHz HE PPDU transmitted over the primary sub-channel.

According to some embodiments, the wireless receiving device is an EHT wireless receiving device, wherein the control frame comprises control information, wherein the control frame is operable to be decoded by the EHT wireless receiving device to access the control information by processing the plurality of duplicated 20 MHz HE PPDUs and the PPDU transmitted over the primary 20 MHz sub-channel.

According to some embodiments, the wireless receiving device performs packet detection using 64-point cross-correlations.

According to some embodiments, the wireless receiving device performs 80 MHz channel estimation and synchronization according to an L-LTF field of the control frame.

According to some embodiments, the wireless receiving device performs Maximum Ratio Combining (MRC) of the duplicated 20 MHz HE PPDUs and the PPDU transmitted over the primary 20 MHz sub-channel for demodulation and decoding.

According to another embodiment, a method of low power indoor (LPI) reception in a wireless network is disclosed. The method includes receiving a 20 MHz HE PPDU transmitted over a primary wireless sub-channel using LPI transmission, receiving a plurality of duplicated 20 MHz HE PPDUs transmitted over different wireless sub-channels using LPI transmission, and decoding a control frame according to at least one of: the 20 MHz HE PPDU transmitted over the primary wireless sub-channel; and the plurality of duplicated 20 MHz HE PPDUs transmitted over different wireless sub-channels.

According to some embodiments, the plurality of duplicated 20 MHz HE PPDUs comprises 3 duplicated 20 MHz HE PPDUs, and wherein the PPDU transmitted over the primary 20 MHz sub-channel and the plurality of duplicated 20 MHz HE PPDUs are transmitted over an 80 MHz bandwidth.

According to some embodiments, the LPI transmissions are performed over a 6 GHz wireless band.

According to some embodiments, the control frame is a beacon frame.

According to some embodiments, the method includes performing packet detection using 64-point cross-correlations.

According to some embodiments, the method includes performing 80 MHz channel estimation and synchronization according to an L-LTF field of the control frame.

According to some embodiments, the method includes performing maximum ratio Combining (MRC) of the 20 MHz HE PPDU and the duplicated 20 MHz HE PPDUs for demodulation and decoding.

According to some embodiments, a wireless communication device is disclosed. The device includes a plurality of wireless transceivers, a first preamble processor operable to process a 20 MHz HE PPDU received over a primary wireless sub-channel using LPI transmission, and a second preamble processor operable to process a plurality of duplicated 20 MHz HE PPDUs transmitted over different wireless sub-channels of an 80 MHz bandwidth using LPI transmission, where the first preamble processor and the second preamble processor are further operable to decode a received control frame according to at least one of: the 20 MHz HE PPDU transmitted over the primary wireless sub-channel, and the plurality of duplicated 20 MHz HE PPDUs transmitted over different wireless sub-channels.

According to some embodiments, the second preamble process is further operable to perform maximum ratio combining (MRC) on the plurality of duplicated 20 MHz HE PPDUs.

According to some embodiments, the control frame is a beacon frame.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 is a block diagram depicting an exemplary PPDU with non-HT duplication and legacy preambles depicted according to embodiments of the present invention.

FIG. 3 depicts an exemplary 80 MHz beacon or control frame with HE duplication for improved transmission range according to embodiments of the present invention.

DETAILED DESCRIPTION

Figure 1:
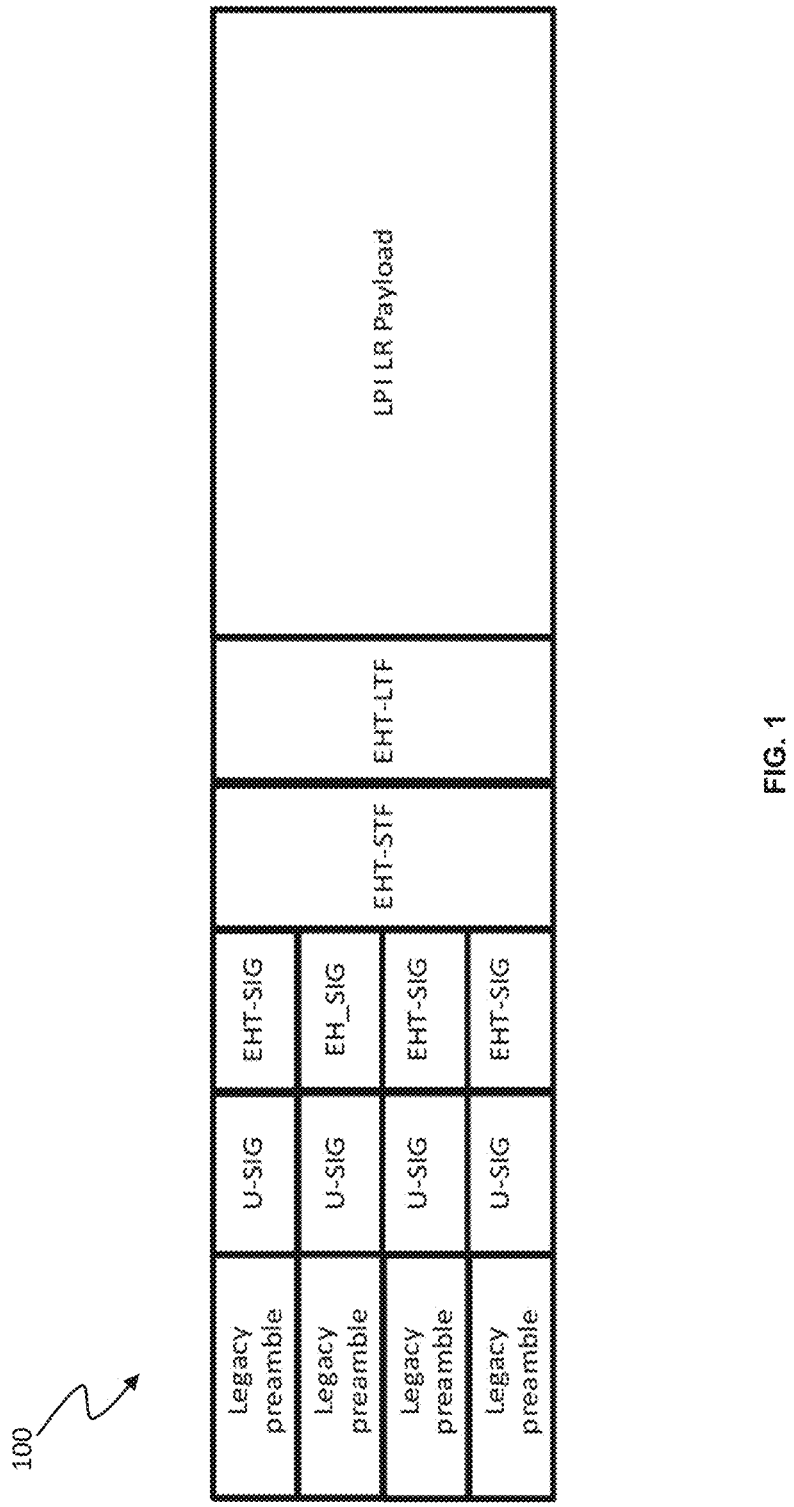
FIG. 1 is a block diagram of an exemplary PPDU with duplication over four wireless sub-channels in EHT WLAN according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 5 and 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Range Extension Transmission Schemes for LPI Transmission in a Wireless Network

As used herein, the term "EHT" may refer generally to a recent generation of wireless communication (Wi-Fi) known as Extremely High Throughput as defined in IEEE 802.11be, and the term "HE" may refer generally to an older generation of wireless Wi-Fi known as High Efficiency, as defined according to the IEEE 802.11ax standards. Non-HT generally refers to legacy stations that are not capable of decoding HT transmissions. The term station (STA) refers generally to an electronic device capable of sending and receiving data over Wi-Fi that is not operating as an access point (AP).

FIG. 1 depicts an exemplary PPDU 100 with duplication over four wireless sub-channels in EHT WLAN according to embodiments of the present invention. In the example of FIG. 1, a 20 MHz PPDU is duplicated over an 80 MHz frequency segment. Each 20 MHz sub-channel includes a preamble (legacy) containing L-STF, L-LTF, L-SIG and RL-SIG fields. The 20 MHz sub-channels also include U-SIG and EHT-SIG fields. A duplication indication is inserted into the U-SIG or EHT-SIG to indicate if the duplication is applied to the payload over DCM+MCS0. However, a PPDU transmitted with duplication cannot typically be decoded by legacy devices because the payload duplication and the EHT preamble duplication will not be understood by legacy devices.

Non-HT Duplication Schemes for Control Frames

According to some embodiments of the present invention, frames can be transmitted with non-HT duplication to extend the transmission range and to maintain backward compatibility with legacy devices. Embodiments of the present invention can transmit beacon frames (e.g., control frames) using HE duplication, for example. A 20 MHz HE SU PPDU can be duplicated over 40 MHz, 80 MHz, 160 MHz or 320 MHz wireless segments. According to some embodiments, the HE-SIGA fields in the HE PPDU include 4-bit CRC, and the receiver can stop decoding when the CRC of HE-SIGA results in error. According to some embodiments, decoding can be halted early based on the basic service set (BSS) color of the receiving device and spatial reuse protocols are used for more efficient transmission.

Figure 2:
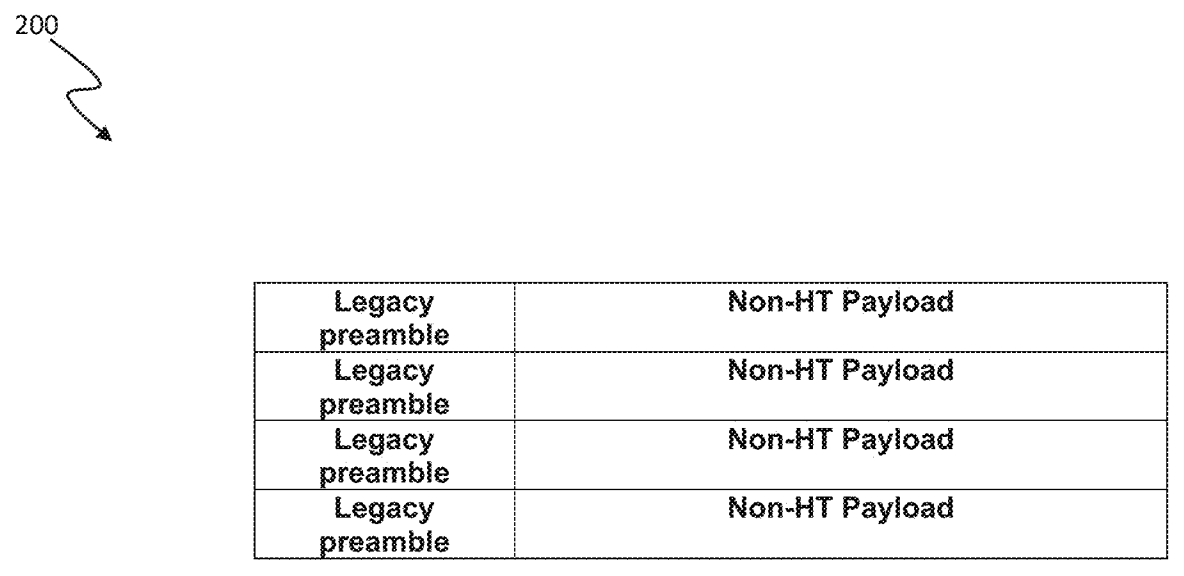

FIG. 2 depicts an exemplary PPDU 200 with non-HT duplication and legacy preambles depicted according to embodiments of the present invention. Beacon and other control frames are typically transmitted in 80 MHz and higher BW with non-HT duplication of each 20 MHz sub-channel. An EHT receiver receiving a transmission with duplication performs 80 MHz packet detection and maximum ratio combining (MRC) over multiple (e.g., 4) 20 MHz sub-channels using the L-SIG subfield of the preamble and the payload.

Some embodiments of the present invention transmit beacon (or other control frames) with HE duplication to extend the range over 6 GHz LPI and to maintain compatibility with HE devices, EHT devices, and future generations of devices. Beacon and other control frames transmitted using 6 GHz LPI bands may be required to use 40 MHz, 80 MHz, 160 MHz, or 320 MHz bandwidth with duplicated HE PPDUs. For example, all beacon and other control frames may be required to be transmitted over 80 MHz with HE duplication, according to some embodiments.

FIG. 3 depicts an exemplary 80 MHz beacon or control frame 300 with HE duplication according to embodiments of the present invention. An HE receiving station can process only the primary 20 MHz sub-channel to retrieve information associated with the duplicated PPDU. On the other hand, transmission range can be improved by the HE receiving station processing the entire 80 MHz PPDU 300 including the duplicated preamble and payload using enhanced packet detection combined with all four 20 MHz sub-channels.

An EHT station may processes the primary 20 MHz sub-channel or processes the 80 MHz segment (four 20 MHz sub-channels) as a whole in parallel. Processing the 80 MHz segment as a whole can extend the range of reception for 80 MHz HE duplicated beacon or control frames with an extra 6 dB of sensitivity compared to processing the primary 20 MHz sub-channel only. Moreover, 20 MHz and 40 MHz HE PPDUs are typically transmitted over the air (e.g., from an overlapping basic service set) in the 6 GHz LPI band, and therefore processing the 80 MHz as whole may result in error unless the primary 20 MHz sub-channel is processed.

According to embodiments, processing an 80 MHz segment or channel (e.g., four 20 MHz sub-channels) as a whole can include 64 point cross-correlations during L-STF, 80 MHz channel estimation and synchronization performed on L-LTF, MRC combining of each 20 Mhz sub-channel for L-SIG, RL-SIG and HE-SIG-A demodulation and decoding, and MRC combining of each 20 Mhz sub-channel for HE payload demodulation and decoding.

Figure 4:
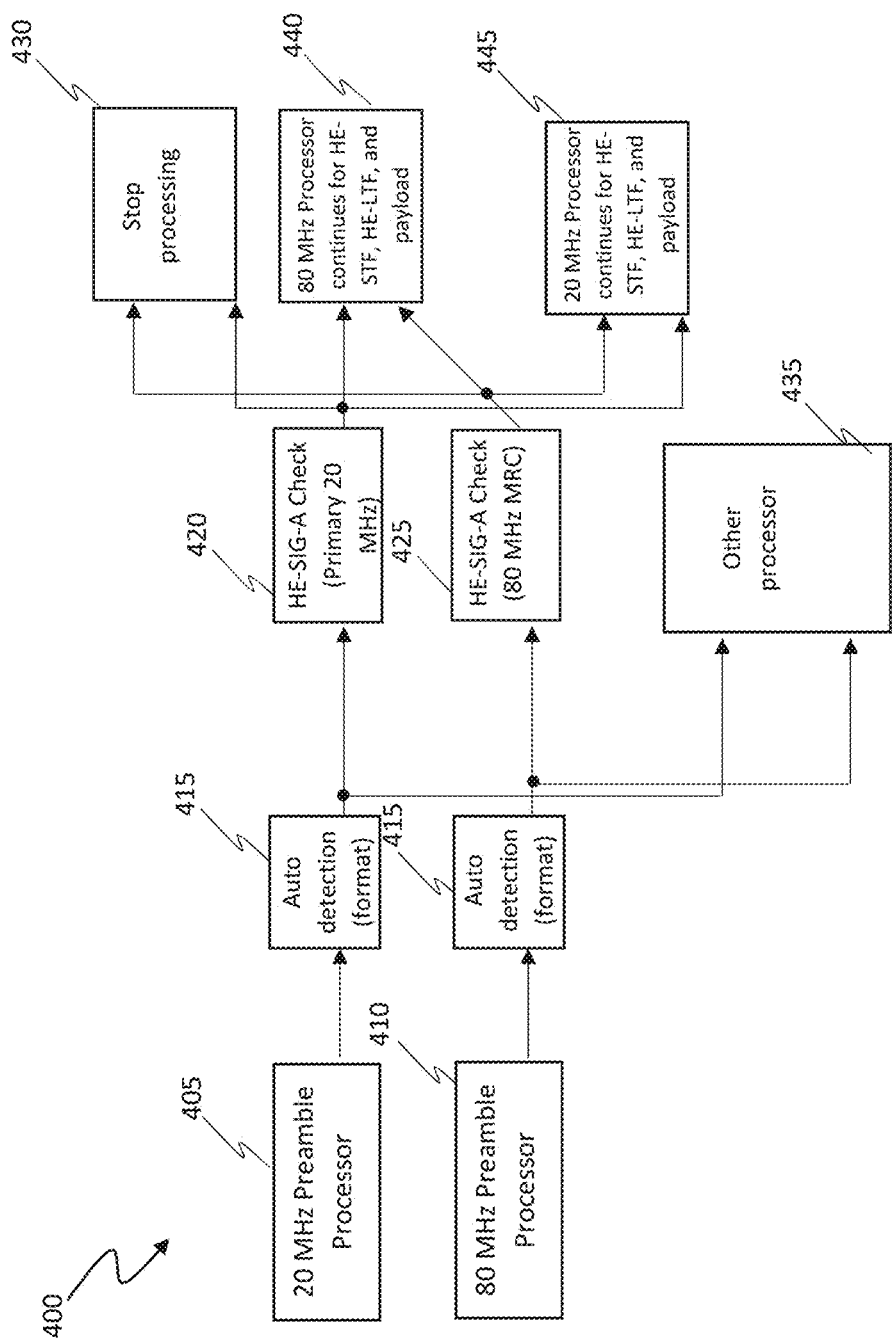
FIG. 4 is a flow chart and data flow diagram depicting an exemplary computer-implemented process for automatically detecting and receiving packets to improve transmission range over 6 GHz LPI while maintaining backwards compatibility with legacy devices according to embodiments of the present invention.

FIG. 4 depicts an exemplary computer-implemented process 400 for automatically detecting and receiving packets to improve transmission range over 6 GHz LPI while maintaining backwards compatibility with legacy devices according to embodiments of the present invention. 20 MHz preamble processor 405 and 80 MHz preamble processor 410 perform packet detection to identify a received PPDU as an HE PPDU or non-HE PPDU. If the preamble processors 405/410 determine that a received PPDU is a non-HE PPDU, the PPDU is passed to another processor 435. If the preamble processors 405/410 determine that a received PPDU is an HE PPDU, an HE-SIG-A check is performed.

As depicted in FIG. 4, 20 MHz preamble processor 405 performs auto detection 415 to determine that the received PPDU is an HE PPDU, and checks the HE-SIG-A field 420 of the primary 20 MHz sub-channel to determine if the PPDU should be processed by 20 MHz preamble processor 405. If the HE-SIG-A check fails (e.g., the PPDU is from an overlapping basic service set), the processing can halt immediately (430).

80 MHz preamble processor 410 can check the HE-SIG-A field 425 over the entire 80 MHz PPDU using maximum ratio combining (MRC). The 80 MHz PPDU can be processed by 80 MHz preamble processor 410 according to the HE-SIG-A field 425 for decoding the HE-STF, HE-LTF, and payload. If both processors determine that the received frame is a not an HE frame, the received frame is passed to another processor 435.

As mentioned above, an EHT station can process the primary 20 MHz sub-channel or processes the 80 MHz segment (four 20 MHz sub-channels) as a whole in parallel. Processing the 80 MHz segment as a whole at step 440 can extend the range of reception for 80 MHz HE duplicated beacon or control frames with an extra 6 dB of sensitivity compared to processing the primary 20 MHz only at step 445.

Figure 5:
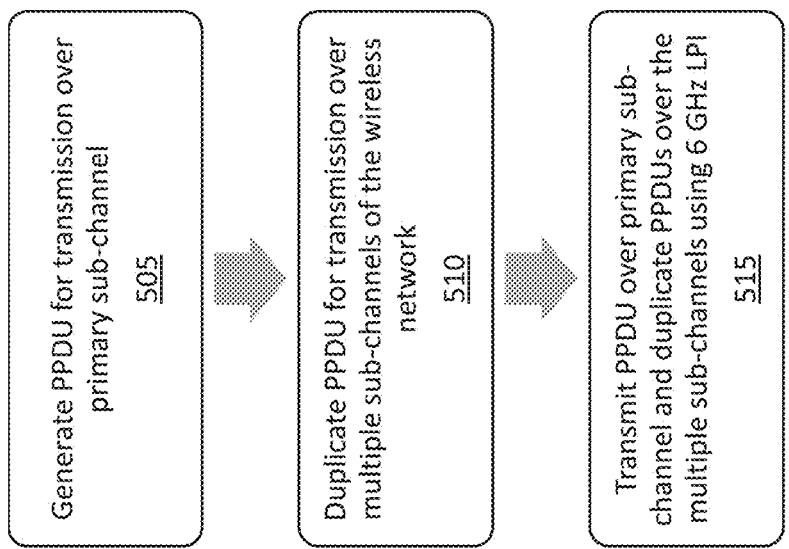
FIG. 5 is a flow chart of an exemplary sequence of computer implemented steps for automatically transmitting information over 6 GHz LPI according to embodiments of the present invention.

FIG. 5 is a flow chart of an exemplary sequence of computer implemented steps of a process 500 for automatically transmitting information over 6 GHz LPI according to embodiments of the present invention.

At step 505, a PPDU is generated for transmission over a wireless network capable of 6 GHz LPI operation. The PPDU can include a beacon frame or other control frame, for example, transmitted for receipt by a wireless STA. The STA can be an EHT device or a legacy device such as an HE wireless STA. The PPDU is associated with a primary sub-channel of the wireless network. The PPDU can include a non-HT (e.g., HE) payload and a legacy preamble. According to some embodiments, the preamble includes L-STF, L-LTF, L-SIG, RL-SIG, HE-SIG-A, HE-STF, AND HE-LTF fields. DCM+MCS0 or duplication over DCM+MCS0 can be applied to the payload, and a duplication indication is inserted into the U-SIG or EHT-SIG to indicate duplication on the payload over DCM+MCS0.

At step 510, the PPDU is duplicated for transmission over multiple wireless sub-channels of the wireless network. For example, the PPDU can be a 20 MHz PPDU duplicated over a 40 MHz, 80 MHz, 160 MHz, or 320 MHz bandwidth. Each duplicate PPDU can be associated with a different wireless sub-channel for transmission over the wireless network.

At step 515, the PPDU is transmitted over the primary sub-channel and the duplicate PPDUs are transmitted over the respective sub-channels for receipt by the wireless STA using 6 GHz LPI. Transmitting the duplicate PPDUs in this way extends the range of the transmission and maintains backwards compatibility with legacy (e.g., non-HT) devices. Some devices, such as HE devices, may elect to receive/decode only the PPDU transmitted over the primary sub-channel.

Figure 6:
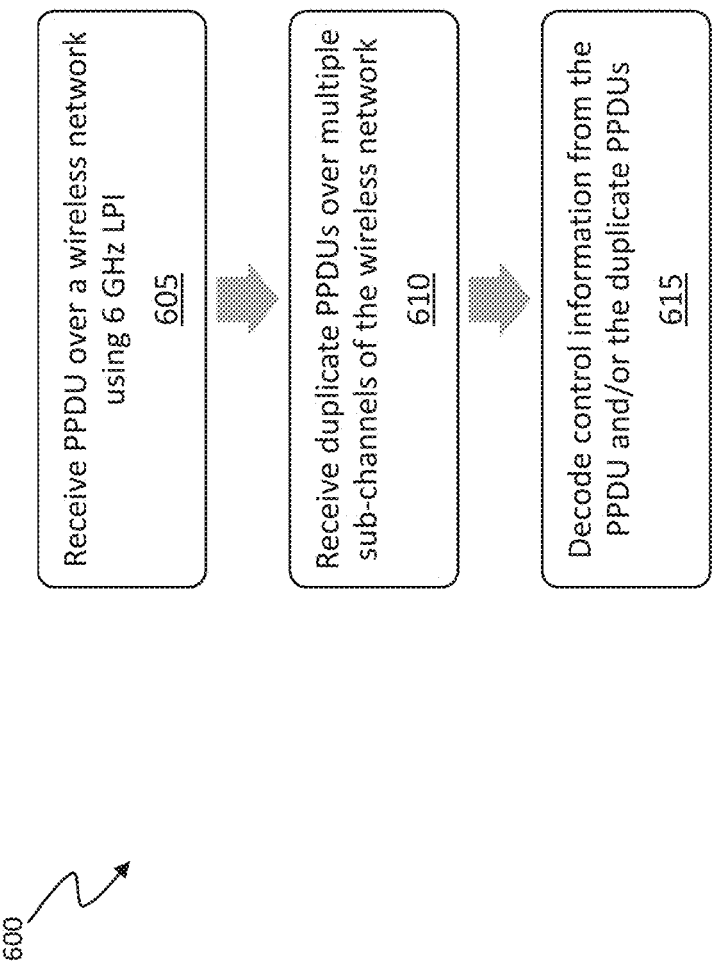
FIG. 6 is a flow chart of an exemplary sequence of computer implemented steps for automatically receiving information over 6 GHz LPI according to embodiments of the present invention.

FIG. 6 is a flow chart of an exemplary sequence of computer implemented steps for automatically receiving information over 6 GHz LPI according to embodiments of the present invention.

At step 605, a PPDU is received by a wireless STA over a wireless network using 6 GHz LPI. The PPDU includes control information (e.g., a beacon frame or other control frame). The STA can be an EHT device or a legacy device such as an HE wireless STA. The PPDU is associated with a primary sub-channel of the wireless network. The PPDU can include a non-HT (e.g., HE) payload and a legacy preamble. According to some embodiments, the preamble includes L-STF, L-LTF, L-SIG, RL-SIG, HE-SIG-A, HE-STF, AND HE-LTF fields. DCM+MCS0 or duplication over DCM+MCS0 can be applied to the payload, and a duplication indication is inserted into the U-SIG or EHT-SIG to indicate duplication on the payload over DCM+MCS0.

At step 610, duplicates of the PPDU are optionally received over multiple wireless sub-channels of the wireless network. For example, the duplicate PPDUs can be 20 MHz PPDUs duplicated over a 40 MHz, 80 MHz, 160 MHz, or 320 MHz bandwidth. Each duplicate PPDU can be associated with a different wireless sub-channel for transmission over the wireless network.

At step 615, the control information is decoded from the received PPDU or PPDUs received by the wireless STA. Decoding the control information can include decoding only the PPDU transmitted over the primary channel or decoding all of the received PPDUs together using 80 MHz packet detection and maximum ratio combining, for example. According to some embodiments, step 615 includes determining that a PPDU was transmitted by a device of an overlapping basic service set and halting the reception of the PPDU.

Exemplary Computer Controlled System

Figure 7:
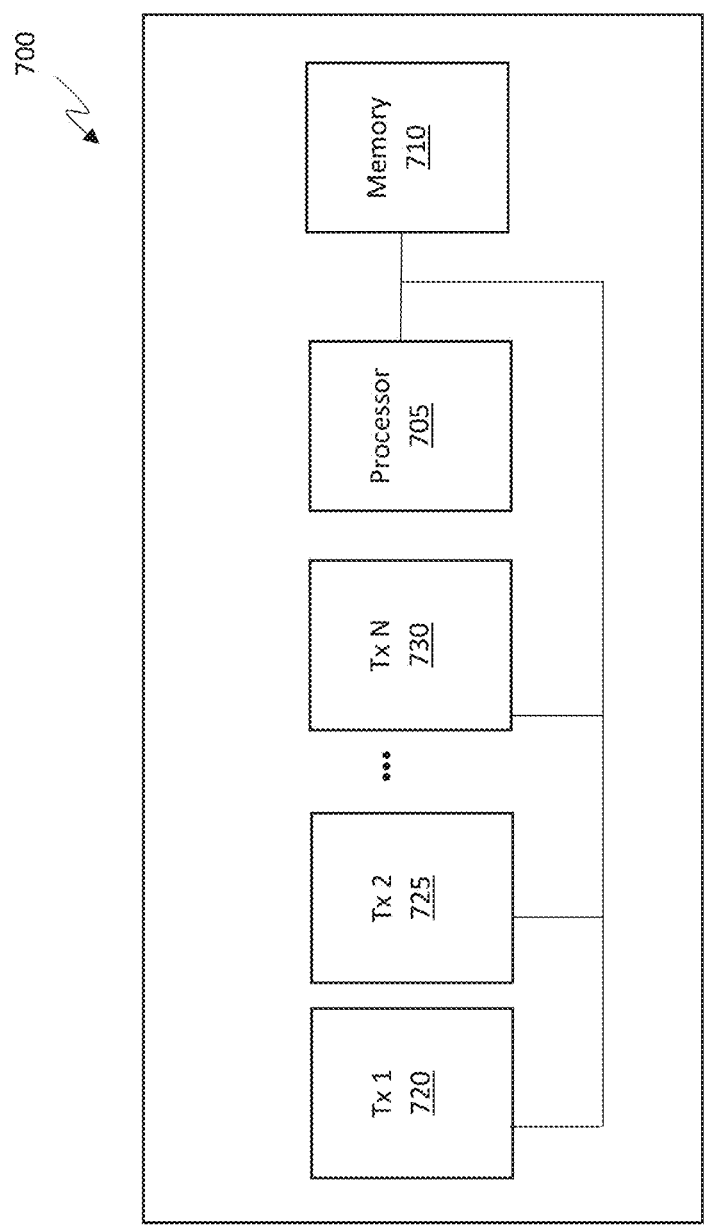
FIG. 7 is a block diagram depicting an exemplary computer system platform upon which embodiments of the present invention may be implemented.

FIG. 7 depicts an exemplary wireless device 700 upon which embodiments of the present invention can be implemented. Embodiments of the present invention are drawn to electronic systems for transmitting data over 6 GHz LPI with duplication to improve transmission range and maintain backwards compatibility with legacy devices. The following discussion describes one such exemplary electronic system or computer system that can be used as a platform for implementing embodiments of the present invention. The exemplary computer system 712 can be a wireless access point or a wireless station, for example.

The wireless device 700 includes a processor 705 for running software applications and optionally an operating system. Memory 710 can include read-only memory and/or random access memory, for example, to store applications and data (e.g., tables of index values) for use by the processor 705 and data received or transmitted by transceivers 720, 725, and 730 over different wireless links. The wireless device 700 can include fewer or more transceivers according to some embodiments. The transceivers 720, 725, 730 communicate with other electronic devices over a wireless network (e.g., WLAN) and typically operates according to IEEE standards (e.g., IEEE 802.11ax, IEEE 802.11ay, IEEE 802.11be, etc.).

Processor 705 can be one processor or can include multiple processors. For example, process 705 can include a central processing unit (CPU), and multiple preamble processors. According to some embodiments, processor 705 includes a 20 MHz preamble processor and an 80 MHz preamble processor.

Embodiments of the present invention are thus described. While the present invention has been described in particular embodiments, it should be appreciated that the present invention should not be construed as limited by such embodiments, but rather construed according to the following claims.

What is claimed is:

1. A method of low power indoor (LPI) transmission in a wireless network, the method comprising:
generating a 20 MHz high efficiency (HE) physical layer protocol data unit (PPDU) comprising a control frame;
duplicating the 20 MHz HE PPDU to generate a plurality of duplicated 20 MHz HE PPDUs associated with different wireless sub-channels; and
transmitting the 20 MHz HE PPDU and the plurality of duplicated 20 MHz HE PPDUs to a wireless receiving device using LPI transmission, wherein the 20 MHz HE PPDU is operable to be processed using a first preamble processor, and wherein the plurality of duplicated 20 MHz HE PPDUs are operable to be processed using a second preamble processor.

2. The method of claim 1, wherein the plurality of duplicated 20 MHz HE PPDUs comprises 3 duplicated 20 MHz HE PPDUs, and wherein the 20 MHz HE PPDU and the plurality of duplicated 20 MHz HE PPDUs are transmitted over an 80 MHz bandwidth.

3. The method of claim 1, wherein the LPI transmission is performed over a 6 GHz wireless band.

4. The method of claim 1, wherein the control frame is a beacon frame.

5. The method of claim 1, further comprising transmitting the 20 MHz HE PPDU over a primary 20 MHz sub-channel.

6. The method of claim 5, wherein the wireless receiving device is an HE wireless receiving device, wherein the control frame comprises control information, wherein the control frame is operable to be decoded by the HE wireless receiving device to access the control information according to the 20 MHz HE PPDU transmitted over the primary 20 MHz sub-channel.

7. The method of claim 5, wherein the wireless receiving device is an HE wireless receiving device, wherein the control frame comprises control information, wherein the control frame is operable to be decoded by the HE wireless receiving device to access the control information by processing the plurality of duplicated 20 MHz HE PPDUs and the 20 MHz HE PPDU transmitted over the primary sub-channel.

8. The method of claim 5, wherein the wireless receiving device is an EHT wireless receiving device, wherein the control frame comprises control information, wherein the control frame is operable to be decoded by the EHT wireless receiving device to access the control information by processing the plurality of duplicated 20 MHz HE PPDUs and the PPDU transmitted over the primary 20 MHz sub-channel.

9. The method of claim 1, wherein the wireless receiving device performs 80 MHz channel estimation and synchronization according to a legacy long training field (L-LTF) field of the control frame.

10. The method of claim 1, wherein the wireless receiving device performs Maximum Ratio Combining (MRC) of the duplicated 20 MHz HE PPDUs and the PPDU transmitted over the primary 20 MHz sub-channel for demodulation and decoding.

11. The method of claim 1, wherein the wireless receiving device performs packet detection using 64-point cross-correlations.

12. A method of low power indoor (LPI) reception in a wireless network, the method comprising:
    receiving a 20 MHz HE PPDU transmitted over a primary wireless sub-channel using LPI transmission;
    receiving a plurality of duplicated 20 MHz HE PPDUs transmitted over different wireless sub-channels using LPI transmission; and
    decoding a control frame according to at least one of: the 20 MHz HE PPDU transmitted over the primary wireless sub-channel and processed using a first preamble processor; and the plurality of duplicated 20 MHz HE PPDUs transmitted over different wireless sub-channels and processed using a second preamble processor.

13. The method of claim 12, wherein the plurality of duplicated 20 MHz HE PPDUs comprises 3 duplicated 20 MHz HE PPDUs, and wherein the PPDU transmitted over the primary 20 MHz sub-channel and the plurality of duplicated 20 MHz HE PPDUs are transmitted over an 80 MHz bandwidth.

14. The method of claim 12, wherein the LPI transmissions are performed over a 6 GHz wireless band.

15. The method of claim 12, wherein the control frame is a beacon frame.

16. The method of claim 12, further comprising performing packet detection using 64-point cross-correlations.

17. The method of claim 12, further comprising performing 80 MHz channel estimation and synchronization according to an L-LTF field of the control frame.

18. The method of claim 12, further comprising performing maximum ratio Combining (MRC) of the 20 MHz HE PPDU and the duplicated 20 MHz HE PPDUs for demodulation and decoding.

19. A wireless communication device, comprising:
    a plurality of wireless transceivers;
    a first preamble processor operable to process a 20 MHz HE PPDU received over a primary wireless sub-channel using LPI transmission; and
    a second preamble processor operable to process a plurality of duplicated 20 MHz HE PPDUs transmitted over different wireless sub-channels of an 80 MHz bandwidth using LPI transmission,
    wherein the first preamble processor and the second preamble processor are further operable to decode a received control frame according to at least one of: the 20 MHz HE PPDU transmitted over the primary wireless sub-channel; and the plurality of duplicated 20 MHz HE PPDUs transmitted over different wireless sub-channels.

20. The wireless communication device of claim 19, wherein the second preamble processor is further operable to perform maximum ratio combining (MRC) on the plurality of duplicated 20 MHz HE PPDUs.

21. The wireless communication device of claim 19, wherein the control frame is a beacon frame.

* * * * *